(12) United States Patent
Maisotsenko et al.

(10) Patent No.: US 6,948,558 B2
(45) Date of Patent: Sep. 27, 2005

(54) EVAPORATIVE DUPLEX COUNTERHEAT EXCHANGER

(75) Inventors: Valeriy Stepanovich Maisotsenko, Aurora, CO (US); Leland Earl Gillan, Denver, CO (US); Timothy Lawrence Heaton, Arvada, CO (US); Alan Dale Gillan, Denver, CO (US)

(73) Assignee: Idalex Technologies, Inc., Arvada, CO (US)

( * ) Notice: Subject to any disclaimer, the term of this patent is extended or adjusted under 35 U.S.C. 154(b) by 63 days.

(21) Appl. No.: 10/619,529

(22) Filed: Jul. 15, 2003

(65) Prior Publication Data

US 2005/0056029 A1    Mar. 17, 2005

Related U.S. Application Data

(60) Provisional application No. 60/421,754, filed on Oct. 28, 2002, provisional application No. 60/397,322, filed on Jul. 20, 2002.

(51) Int. Cl.[7] .............................................. F28B 1/00
(52) U.S. Cl. ..................... 165/110; 165/115; 60/39.59
(58) Field of Search ..................... 165/110, 111–115; 62/101, 476; 60/39.59, 775

(56) References Cited

U.S. PATENT DOCUMENTS

| | | | |
|---|---|---|---|
| 151,263 A * | 5/1874 | Audouin | 165/113 |
| 314,559 A * | 3/1885 | Barawanath | 165/113 |
| 1,558,573 A * | 10/1925 | Bancel | 165/113 |
| 1,922,843 A * | 8/1933 | Ehrhart | 165/113 |
| 2,596,195 A * | 5/1952 | Arbuckle | 62/335 |
| 2,832,431 A * | 4/1958 | Lovelady et al. | 96/186 |
| 2,869,324 A | 1/1959 | Foote | |
| 3,369,361 A | 2/1968 | Craig | |
| 4,249,596 A * | 2/1981 | Tutak et al. | 165/113 |
| 4,509,324 A | 4/1985 | Urbach et al. | |
| 4,537,023 A | 8/1985 | Nakamura et al. | |
| 5,024,064 A * | 6/1991 | Yonezawa et al. | 62/106 |
| 5,160,096 A | 11/1992 | Perkins et al. | |
| 5,178,210 A * | 1/1993 | Guillet et al. | 165/111 |
| 5,212,956 A * | 5/1993 | Tsimerman | 62/94 |
| 5,453,223 A | 9/1995 | Maisotsenko | |

(Continued)

OTHER PUBLICATIONS

Heaton, "The Maisotsenko Cycle and the Idalex Heat and Mass Exchanger," Dec. 2000, 4 pages.

(Continued)

*Primary Examiner*—Terrell Mckinnon
(74) *Attorney, Agent, or Firm*—Francis L. Conte

(57) ABSTRACT

A duplex exchanger includes first and second heat exchangers each including a main flow channel and a cooperating counterheat channel. The first counterheat channel is joined to the first main flow channel for receiving a cooled primary stream therefrom. The second counterheat channel is also joined to the first main channel splitting the primary stream therefrom. An evaporative coolant is injected into the first counterheat channel, and an evaporative saturant is injected into the second counterheat channel. Heat from the initially hot primary stream in the first exchanger evaporates the coolant in the first counterheat channel for self-cooling the primary stream in the first main channel. Heat from a hot secondary stream channeled through the second main channel evaporates the saturant in the second counterheat channel for adding mass to the primary stream channeled therethrough.

33 Claims, 8 Drawing Sheets

U.S. PATENT DOCUMENTS

| | | | |
|---|---|---|---|
| 5,479,783 A * | 1/1996 | Uchida | 62/101 |
| 6,158,238 A | 12/2000 | Lampinen et al. | |
| 6,497,107 B2 | 12/2002 | Maisotsenko et al. | |
| 6,581,402 B2 | 6/2003 | Maisotsenko et al. | |
| 6,584,776 B2 | 7/2003 | Mittricker et al. | |
| 2003/0033821 A1 | 2/2003 | Maisotsenko et al. | |
| 2004/0103637 A1 * | 6/2004 | Maisotsenko et al. | 60/39.59 |

OTHER PUBLICATIONS

Idalextechnologies.com Web Site, "FAQS," Jul. 31, 2002, 3 pages.

Gillan et al, Maisotsenko Open Cycle Used for Tubine Power Generation, ASME GT2003-38080, accept d Dec. 2002 for conference Jun. 16-19, 2003.

* cited by examiner

EVAPORATIVE DUPLEX COUNTERHEAT EXCHANGER

This application claims priority from Provisional Patent Application 60/397,322; filed Jul. 20, 2002, and Provisional Patent Application 60/421,754; filed Oct. 28, 2002.

BACKGROUND OF THE INVENTION

The present invention relates generally to gas turbine power generation, and, more specifically, to heat exchangers therein.

In a gas turbine engine, ambient air is pressurized in a compressor and mixed with fuel in a combustor for generating hot combustion gases. Energy is extracted from the combustion gases in a turbine which powers the compressor through a shaft joined thereto. Output power may be extracted from the same turbine powering the compressor, or from a low pressure turbine disposed downstream therefrom. The output shaft power may be used for driving an electrical generator in a typical application.

The efficiency of the turbine system is based in large part on efficient compression of the air, coupled with efficient combustion of the air mixed with fuel for producing the combustion gases from which energy is extracted by the turbine. The air discharged from the compressor is relatively hot due to the compression heating thereof and has a corresponding temperature, pressure, and density upon entering the combustor.

Various forms of heat exchangers are known in the turbine field. In one example, a heat exchanger known as a recuperator uses the hot combustion gases for further heating the compressed air prior to use in the combustor. In this way, otherwise waste heat from the turbine is reintroduced into the turbine cycle.

Furthermore, it is also known to inject steam into the combustion gases for increasing the mass flow thereof for also increasing overall efficiency of the turbine cycle. However, recuperators and steam injection require corresponding apparatus therefor and increase the complexity and cost of the turbine system.

In a separate development of heat exchangers, evaporative cooling may be used for cooling air below its wet bulb temperature and up to its dew point temperature in an improved cooling cycle. This Maisotsenko Cycle is disclosed in various configurations in various patents, including U.S. Pat. Nos. 5,453,223; 6,497,107; and 6,581,402. Additional information for this cycle is available on the worldwide web at idalextechnologies.com.

Accordingly, it is desired to improve heat exchanger performance in turbine cycles, for example, employing yet another advancement in the Maisotsenko Cycle.

BRIEF SUMMARY OF THE INVENTION

A duplex exchanger includes first and second heat exchangers each including a main flow channel and a cooperating counterheat channel. The first counterheat channel is joined to the first main flow channel for receiving a cooled primary stream therefrom. The second counterheat channel is also joined to the first main channel splitting the primary stream therefrom. An evaporative coolant is injected into the first counterheat channel, and an evaporative saturant is injected into the second counterheat channel. Heat from the initially hot primary stream in the first exchanger evaporates the coolant in the first counterheat channel for self-cooling the primary stream in the first main channel. Heat from a hot secondary stream channeled through the second main channel evaporates the saturant in the second counterheat channel for adding mass to the primary stream channeled therethrough.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
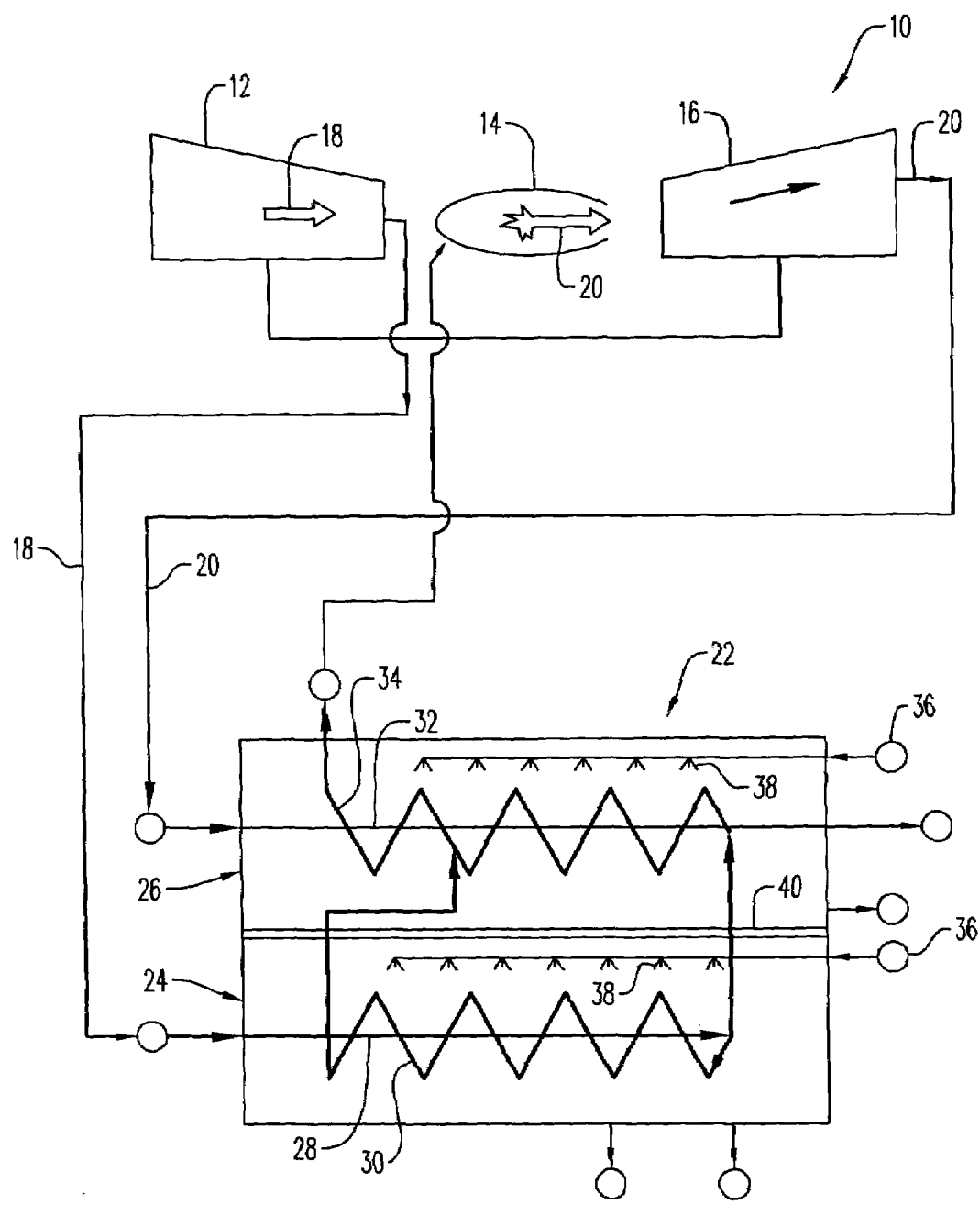
FIG. 1 is a schematic representation of a split counterflow, duplex exchanger saturator in an exemplary turbine cycle application.

Illustrated schematically in FIG. 1 is a gas turbine system 10 including in serial flow communication a multistage compressor 12, combustor 14, and turbine 16 which may have any conventional configuration. Ambient air 18 is pressurized in the compressor during operation and mixed with fuel in the combustor for generating hot combustion gases 20 which flow downstream to the turbine.

Energy is extracted from the combustion gases in turbine rotor blades which are supported to a rotor disk joined by a shaft to the rotor blades of the compressor for providing power thereto. Output power may be obtained from the high pressure turbine, or in another conventional configuration may be obtained from a low pressure turbine disposed downstream therefrom and mounted on a separate driveshaft (not shown). The output power may be used for any suitable purpose, such as powering an electrical generator (not shown) in a typical power generation system.

As indicated above, the efficiency of the turbine system illustrated in FIG. 1 is based in part on the efficiency of compression of the ambient air 18, efficiency of combustion of the air and fuel in the combustor, and in additional part on the efficiency of energy extraction from the combustion gases in the turbine. One manner of improving the overall efficiency of the turbine system illustrated in FIG. 1 is to add mass to the pressurized air 18 discharged from the compressor for increasing the mass flowrate of the combustion gases 20 channeled through the turbine.

Shown schematically in FIG. 1 is an evaporative duplex counterheat exchanger or apparatus 22 configured as a humidifier or saturator for cooperating with the components of the turbine system for efficiently introducing additional mass to the compressor discharge air 18 during operation. More specifically, the duplex exchanger is an assembly of components including a first or primary heat exchanger 24 and a cooperating second or secondary heat exchanger 26.

The first heat exchanger includes a first main flow channel 28 for receiving a primary gas stream in the exemplary form of the hot compressed air 18 from the compressor suitably joined thereto. The first exchanger also includes a first counterheat channel 30 joined in flow communication with the first main channel 28.

Correspondingly, the second heat exchanger 26 includes a second main flow channel 32 for receiving a secondary fluid stream in the exemplary form of the hot combustion gases 20 discharged from the turbine 16 suitably joined thereto. The second heat exchanger also includes a second counterheat channel 34 joined in flow communication with the first heat exchanger.

The first and second counterheat channels may be configured in any conventional manner to channel flow in opposition, or countercurrent, to the main flows being channeled in the corresponding first and second main flow channels for exchanging heat therewith. Accordingly, the counterheat is typically effected by conventionally introducing counterflow in any suitable direction opposite to the direction of the main flow, and is typically oblique thereto in serpentine fashion, with a corresponding amount of lateral crossflow. In other embodiments, counterheat may be introduced by lateral crossflow alone, or other forms of countercurrent flow.

Means 36 are provided in the duplex exchanger for injecting an evaporative fluid 38 into the first counterheat channel 30 during operation. The injecting means may have any conventional form for suitably injecting or dispensing or spraying or wicking or otherwise introducing the evaporative fluid into the counterheat channel for cooperating with the primary gas stream therein as further described hereinbelow. In the exemplary application illustrated in FIG. 1, mass may be added to the compressed air 18 by the introduction of water vapor therein, and therefore the evaporative fluid 38 is simply water, injected in any convenient manner for this purpose.

However, the duplex exchanger may be used in various other applications in which cooling of a fluid is desired, or saturation of one fluid into another is desired in various amounts, and therefore the evaporative fluid may have any suitable form, including petroleum liquids or diesel fuel for specific examples associated with turbine cycles. In other applications, other evaporative fluids may be used.

The two heat exchangers cooperate with each other by suitably joining the second counterheat channel 34 in flow communication with the discharge end of the first main channel 28. In this way, the initially hot primary stream 18 is initially self-cooled in the first main channel 28 and then delivered to the inlet end of the second counterheat channel 34 in the second heat exchanger.

The injecting means 36 are also provided for injecting a common evaporative fluid or saturant, also designated 38, into the second counterheat channel 34 in a manner similar to that for injecting the evaporative fluid or coolant into the first counterheat channel. Since the same primary stream 18 is being channeled through both counterheat channels 30,34 the same evaporative fluid 38 may be used in both heat exchangers for similar purposes in providing evaporative cooling of the primary stream in stages, and the humidification or saturation thereof also in stages for reaching full saturation in the primary stream in the preferred embodiment.

The two heat exchangers are similar in configuration and operation including both main and counterheat channels for the primary and secondary flow streams channeled therethrough. The primary stream 18 is split at the discharge end of the first main flow channel 28, with a first, and preferably major portion being channeled to the inlet end of the second counterheat channel 34; and a second, and preferably minor portion of the split primary stream being channeled to the inlet end of the first counterheat channel 30. The split primary streams then flow in counterheat over the two main flow channels 28,32 to the opposite ends thereof.

In a preferred embodiment, the second counterheat channel 34 receives its stream from the discharge end of the first main channel 28, and is additionally joined in flow communication with the discharge end of the first counterheat channel 30 for receiving the split second portion of the primary stream for rejoinder with the split first portion of the primary stream near the downstream end of the second counterheat channel 34. The rejoined primary stream is then discharged from the second heat exchanger 26 through a suitable outlet thereof joined in flow communication with the combustor 14 of the turbine system.

Figure 2:
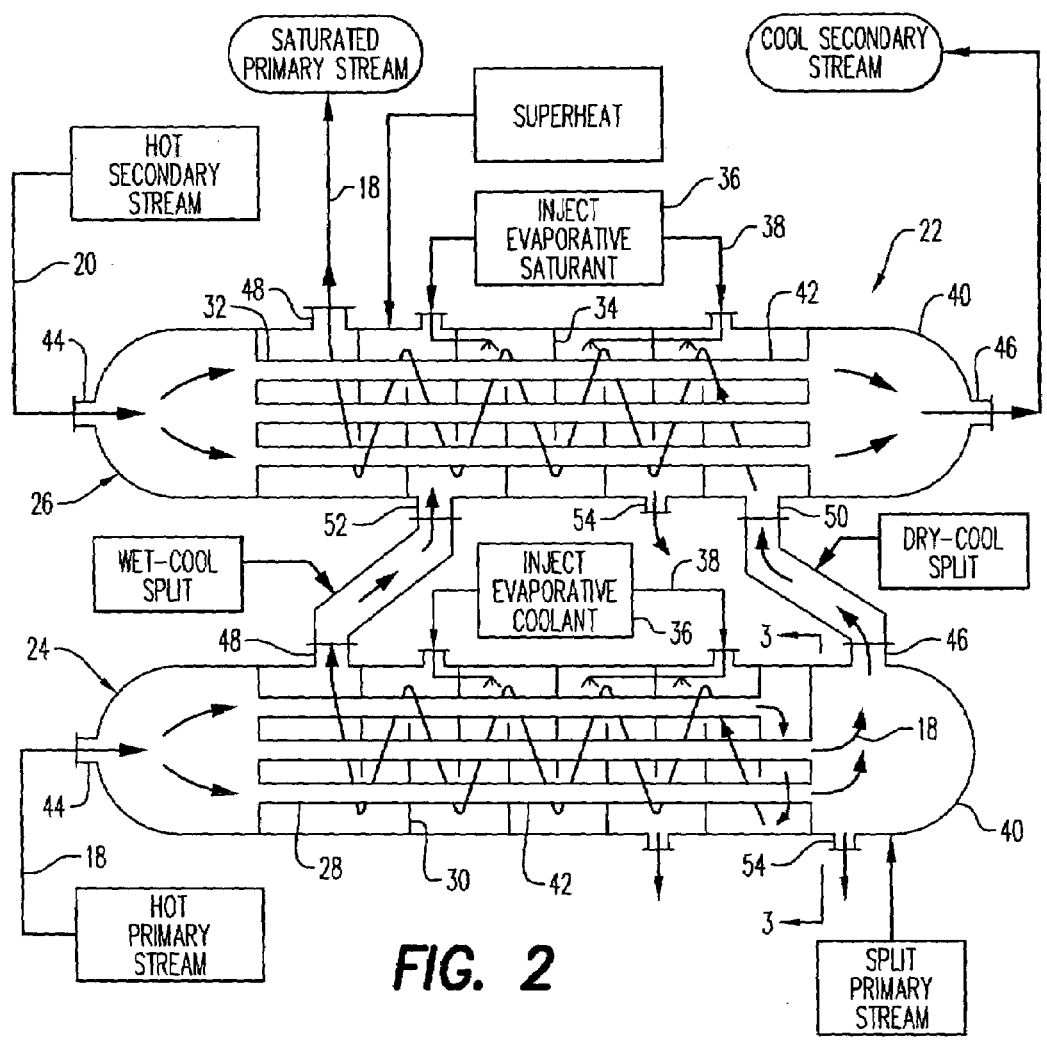
FIG. 2 is a schematic representation of the duplex exchanger saturator of FIG. 1 in accordance with an exemplary tube-in-shell configuration for high pressure applications.

The duplex exchanger 22 illustrated schematically in FIG. 1 may be practiced in various configurations using conventional forms of common heat exchangers. For example, FIG. 2 illustrates a first embodiment of the duplex exchanger configured for use as a split counterflow saturator 22 in a tube-in-shell configuration for use with the high pressure compressor discharge air 18 which may be on the order of 50 atmospheres. FIG. 2 also illustrates in flowchart form an exemplary method of using the duplex exchanger saturator 22 for saturating the hot primary gas stream 18 with the evaporative fluid 38 in the exemplary form of water.

The primary gas stream 18 is the pressurized discharge air from the compressor 12 in the exemplary turbine system, which is relatively hot due to compression therein. The primary stream may have other forms of conventional gases such as natural gas or nitrogen for the exemplary turbine system illustrated; or may have any other chemical composition for which saturation thereof with secondary fluid is desired.

Accordingly, the hot primary gas stream 18 is initially channeled through the first main channel 28 of the first heat exchanger for being cooled therein. At the discharge end of the main channel 28, the primary stream is split into two portions for flow to the corresponding first and second counterheat channels 30,34.

The combustion gases 20 generated in the combustor 14 after their flow through the turbine 16 still have significant heat and may be used to advantage in the saturator 22. Accordingly, the relatively hot secondary fluid stream 20 is suitably channeled from the discharge end of the turbine 16 to the inlet end of the second main channel 32 for use in heating the cooled primary stream being channeled through the second counterheat channel 34.

In typical fashion, the first main channel 28 adjoins in parallel flow the first counterheat channel 30 in opposite directions, i.e., counterflow channel 30. And, the second main channel 32 adjoins in parallel flow the second counterheat channel 34 in opposite directions, i.e., counterflow channel 34. The hot streams 18,20 being channeled through the two main channels are evaporatively cooled by the split primary stream being channeled through the two counterflow channels 30,34, which correspondingly increases both the temperature and humidity thereof.

The evaporative coolant 38 is suitably injected into the first counterflow channel 30 for being evaporated by the hot primary stream flowing through the cooperating first main channel 28. Accordingly, as the coolant evaporates in the counterflow channel, it correspondingly cools the primary stream inside the main flow channel. And, the evaporating coolant adds humidity to the cooled primary stream being discharged through the first counterflow channel for commencing the saturation thereof.

The same evaporative fluid 38, or saturant, is similarly injected into the second counterflow channel 34 for being evaporated by the hot secondary stream 20 flowing through the second main channel 32. The hot secondary stream 20 therefore heats the precooled primary stream in the second counterflow channel 34, with the evaporation of the saturant 38 being used for further humidifying or saturating the primary stream 18 being heated and discharged through the second counterflow channel.

The same primary stream 18 is preferably split at the discharge end of the first main channel 28 for efficient use in both counterflow channels 30,34 of the two heat exchangers. For example, about one third of the total flowrate of the primary stream may be channeled back through the first counterflow channel 30, and the remaining two thirds of the primary stream may be channeled back through the second counterflow channel 34.

The two split primary streams being channeled separately through the two counterflow channels 30,34 will be heated differently and humidified differently but may be rejoined together at a suitable location in the second heat exchanger. For example, the split primary stream 18 from the first counterflow channel 30 may be discharged from an outlet end thereof into an intermediate stage or section of the second counterflow channel 34 to generally match the temperature and humidity of the separately channeled split primary stream.

In the lower or first heat exchanger 24 illustrated in FIG. 2, compressed air 18 enters the tube-side main channel at one end and passes to the opposite end thereof while being cooled sensibly by the evaporation of water being added to the outside of the tubes in the first counterflow channel. The first portion of the cooled compressed air discharged from the first main channel is released into the upper or second heat exchanger 26 and is directed across the tubes of the second main channel in counterflow. The psychometric analysis shows that the temperature of the air in the first heat exchanger is cooled sensibly and incrementally over the length of the main channel therein towards the dew point temperature of the compressed air.

Ideally, the compressed air in the first heat exchanger is sensibly cooled for lowering the wet bulb temperature thereof to the dew point temperature of the incoming compressed air. When the second portion of the cooled air exits the first main channel and is exposed to the water injection, it will be humidified to the wet bulb temperature of the previously cooled dry air. And, as the air continues to travel across the outside of the first main channel in counterflow thereto it is heated by the air inside the main channel for raising the dew point temperature of the counterflow air for ensuring saturation thereof.

The upper or second heat exchanger illustrated in FIG. 2 receives two air streams from the lower heat exchanger: one airstream at the inlet end of the second counterflow channel and another airstream at an intermediate stage downstream therefrom near the forward end of the heat exchanger. The first portion of the dry cooled airstream that leaves the discharge end of the first main channel 28 moves to the upper heat exchanger and is directed in counterflow to the hot turbine exhaust gas being channeled through the second main channel 32.

The cool compressed air in the second counterflow channel is injected with water for humidifying or saturating the air in a manner similar to that in the first heat exchanger. The hot exhaust gases in the second main channel 32 are correspondingly cooled toward the wet bulb temperature of the air in the second counterflow channel 34.

The web bulb temperature of the air in the second counterflow channel increases as it moves in counterflow to the second main flow channel 32 absorbing heat from the secondary stream 20 and raising humidity of the counterflow air. At a predetermined location in the second heat exchanger, the second airstream from the first counterflow channel 30 rejoins the first airstream in the second counterflow channel, and together the rejoined primary stream moves in counterflow to the hot turbine exhaust gases being channeled through the second main channel 32.

Accordingly, the primary stream 18 may be evaporatively cooled in the first main channel 28 for lowering the wet bulb temperature thereof toward the dew point temperature of the incoming primary stream. And, the primary stream in the first counterflow channel 30 may be humidified or saturated to the wet bulb temperature of the cooled primary stream being discharged from the first main channel 28.

Correspondingly, the cooled primary stream in the first counterflow channel 30 is heated by the hot primary stream in the first main channel 28 for raising the dew point temperature thereof and saturating the primary stream therein.

In the second heat exchanger, the evaporative fluid is evaporated in the primary stream in the second counterflow channel 34 and thereby cools the secondary stream 20 in the second main channel toward the wet bulb temperature of the primary stream in the second counterflow channel.

As the cooled primary stream is channeled through the second counterflow channel 34, it is heated by the hot secondary stream in the second main channel 32 for increasing the wet bulb temperature thereof as well as increasing the humidity or saturation thereof. The primary stream may therefore be humidified or saturated as desired for increasing the effective mass thereof and suitably discharged from the saturator for return to the combustor 14 to undergo combustion therein. The additional mass of the primary airstream increases the mass flowrate of the combustion gases 20 being channeled through the turbine 16 for increasing efficiency of the turbine system.

As indicated above, the fluid injecting means 36 illustrated in FIGS. 1 and 2 may have any suitable configuration, including various conduits, nozzles, and valves for controlling the location and flowrate of the evaporative fluid being injected into both heat exchangers. In one embodiment, the evaporative fluid may be injected solely along an initial stage or length of the second counterflow channel 34, with the remaining terminal stage of the second counterflow channel being without fluid injection yet still being subject to heating from the secondary stream having its hottest temperature over the initial length of the second main channel 32. The heat of the secondary stream may therefore be used for adding heat or superheating the primary stream 18 in the second counterflow channel 34 downstream of the initial stage thereof.

Similarly, the evaporative fluid may be injected solely along an initial stage of the first counterflow channel 30 for superheating the split primary stream along the outlet end of the first counterflow channel using the hot primary stream flowing through the first main flow channel.

Figure 3:
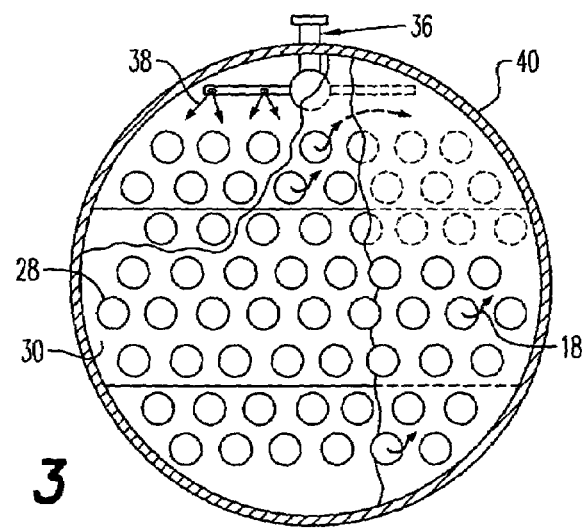
FIG. 3 is a transverse sectional view through the lower heat exchanger illustrated in FIG. 2 and taken along line 3—3.
Figure 4:
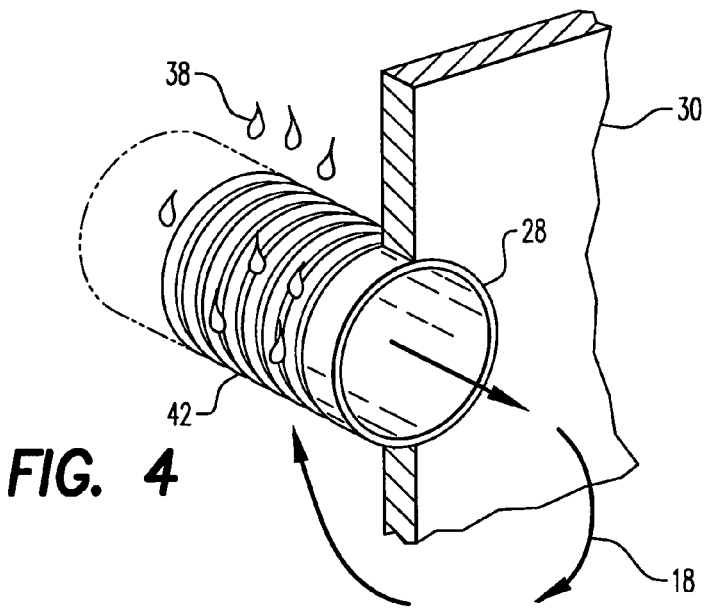
FIG. 4 is a isometric view of an exemplary finned tube in the dual heat exchangers of FIG. 2.

One embodiment of the duplex exchanger saturator 22 specifically configured for a high pressure primary stream is illustrated schematically in FIGS. 2–4. The first heat exchanger 24 includes a bank of first tubes 28 which collectively define the first main channel, with the tubes being supported in a plurality of alternating first baffles 30 which collectively define the first counterflow channel around the first tubes in the lower shell.

Similarly, the second heat exchanger 26 includes a bank of second tubes 32 collectively defining the second main channel. The second tubes are supported in a plurality of alternating second baffles 34 which collectively define the second counterflow channel around the second tubes in the upper shell.

Tube-and-baffle heat exchangers are notoriously well known in various configurations, and may be combined in the manner disclosed above and modified for enjoying the improved performance described herein.

In the exemplary embodiment illustrated in FIG. 2, the first heat exchanger 24 is disposed inside a first tubular shell 40, and the second heat exchanger 26 is similarly disposed in another or second tubular shell 40 of similar design spaced from the first shell. The two shells provide a double septum therebetween which correspondingly separates or divides the two heat exchangers 24,26 from each other for controlling the desired flow streams therebetween. For example, suitable conduits are provided between the two shells for separately channeling the first dry-cool primary stream split and the second wet-cool primary stream split from the first heat exchanger to the second heat exchanger as described above.

As illustrated in FIG. 4, the first tubes 28 preferably include external grooves or fins 42 for increasing wetting and heat transfer surface area thereof for the evaporative fluid. The corresponding tubes 32 of the second heat exchanger may be identical to the first tubes 28 of the first heat exchanger and similarly include the external fins therearound. In this way, efficiency is increased for evaporating the fluid around the two sets of main tubes 28,32 in the two heat exchangers.

In view of the two shell design illustrated in FIG. 2, the first heat exchanger 24 includes a first inlet 44 at a forward end thereof for receiving and providing the primary stream 18 to the first tubes 28. The first exchanger also includes a first outlet 46 at an opposite aft end for discharging the first split portion of the primary stream 18 from the first tubes. A second outlet 48 is disposed between the inlet and first outlet of the first heat exchanger for discharging the second split portion of the primary stream from the first counterflow channel 30.

Correspondingly, the second heat exchanger 26 includes a respective first inlet 44 at its forward end for receiving and providing the secondary stream 20 to the second tubes 32. A respective first outlet 46 is provided at the aft end of the first heat exchanger for discharging the secondary stream 20 from the second tubes 32 as relatively cool waste fluid.

A respective second outlet 48 is also disposed in the second heat exchanger adjacent the first inlet 44 thereof for discharging the saturated primary stream 18 from the second counterflow channel 34 back to the combustor of the exemplary turbine system illustrated in FIG. 1. The second heat exchanger additionally includes a second inlet 50 adjacent its first outlet 46 for receiving the first portion of the primary stream from the corresponding first outlet 46 of the first heat exchanger.

To complete the cooperation between the first and second heat exchangers, the second heat exchanger 26 additionally includes a third inlet 52 adjacent the first inlet 44 thereof for receiving the second portion of the primary stream from the corresponding second outlet 48 of the first heat exchanger 24.

The various inlets and outlets of the two heat exchangers permit the independent operation thereof as typical counterflow heat exchangers, with the additional cooperation therebetween for initially cooling the hot primary stream, splitting that initially dry-cooled stream, and then adding mass or moisture thereto in the two counterflow channels of the two heat exchangers. The primary stream is therefore reheated by both the primary and secondary streams and discharged from the second heat exchanger with added mass by saturation for improving the efficiency of operation of the exemplary turbine system.

Figure 5:
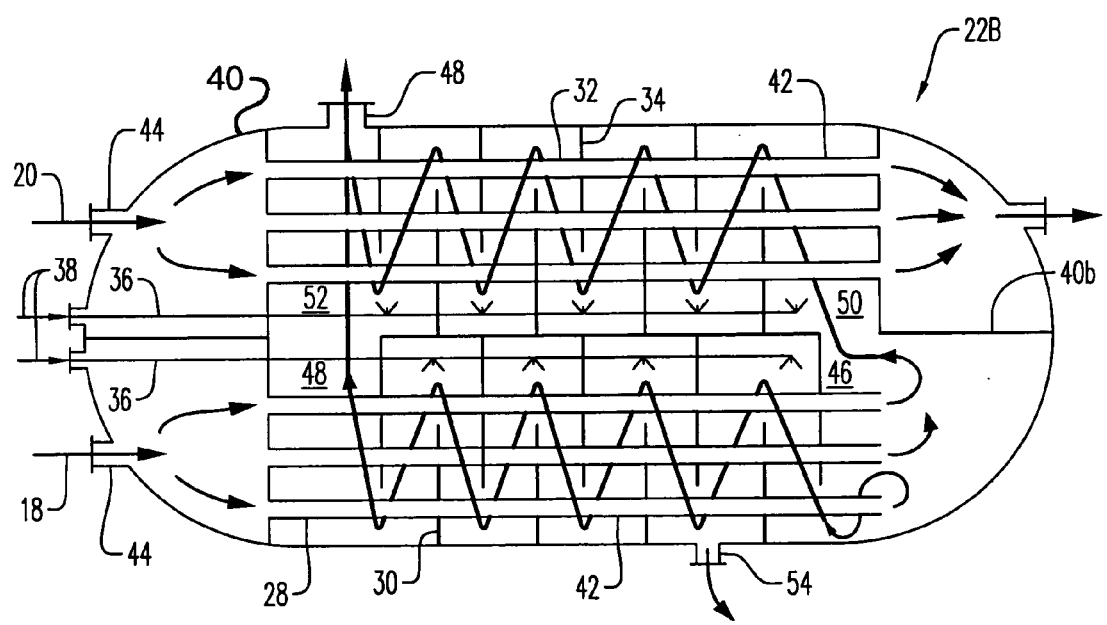
FIG. 5 is a schematic representation of single shell duplex exchanger saturator including dual heat exchangers in an alternate embodiment.

FIG. 5 illustrates an alternate embodiment of the duplex exchanger saturator, designated 22B, in which the two heat exchangers 24,26 are disposed in a common tubular shell 40, with an additional septum 40b dividing the shell into two corresponding compartments for the heat exchangers. The various elements of the two heat exchangers illustrated in FIG. 2 may be similarly introduced in the single-shell saturator illustrated in FIG. 5 with corresponding inlets and outlets interconnected in the same manner as FIG. 2 for providing the cooperating two main flow channels 28,32 and two counterflow channels 30,34.

Accordingly, the single-shell dual heat exchanger embodiment of FIG. 5 is equivalent in function to the dual-shell dual heat exchanger embodiment of FIG. 2, both represented schematically in FIG. 1. It is noted that excess evaporative fluid, such as water, may be injected into the first heat exchanger and will itself be cooled, with the water being coldest near the discharge end of the first tubes 28.

The first heat exchanger, therefore, also includes one or more water outlets 54 for removing the excess water, with the coldest excess water being suitably reused in the overall cycle, such as being injected into the counterflow channels of the heat exchangers. The second heat exchanger 26 also includes one or more water outlets 54 for removing the excess evaporative fluid therefrom. The dual shell saturator configuration was previously introduced in the two provisional patent applications. Features of that description are reproduced as follows.

The dual shell and tube humidifier or saturator 22 illustrated in FIG. 2 uses a principal of thermodynamics dealing with cooling a gas sensibly and then evaporating a liquid into this cooled gas stream. To better describe this process consider the gas to be cooled as hot compressed product air 18 and the liquid to be evaporated as water 38.

The tube humidifier contains two shell and tube heat exchangers: lower heat exchanger 24 and top heat exchanger 26. The lower heat exchanger 24 comprises long and short tubes 28 which are placed between a tube sheet and full baffle at opposite ends, with additional partial baffles 30 in between, and an inlet 44 for the compressed product air 18.

The long tubes, whose forward ends are secured in the tube sheet and aft ends in the full baffle, discharge a first portion of the product air. The short tubes, whose forward ends are also secured in the tube sheet, have aft ends mounted short of the full baffle to form a blind counterflow chamber for passing inside it a second portion of the compressed product air 18. Finally the second portion is directed via a forward duct to the top heat exchanger 26. And, the first portion of the primary airstream 18 is directed from the lower heat exchanger 24 to the top heat exchanger 26 via an aft duct.

The top heat exchanger 26 comprises only long tubes 32, which are placed between two tube sheets. The top exchanger further includes an inlet 44 and outlet 46 at opposite ends for the stack gas 20 from the turbine, and another outlet 48 for the compressed product air 18.

All tubes 28,32 have the outside porous or grooved surface 42, which are wetted by water 38. Both heat exchangers 24,26 also contain water trays, feeders, inlets, outlets, and baffles for steady distribution of the primary airstreams in the open spaces between the tubes.

In the lower heat exchanger 24 the hot compressed product air 18 enters the tubes 28 and passes to their opposite ends being cooled sensibly. The first portion of this cooled air is then passed directly via the aft duct to the top heat exchanger 26. The second portion of the cooled compressed air is released into the blind counterflow chamber at the aft ends of the open short tubes and directed across the tubes in counterflow.

Water 38 is distributed by a water feeder and is sprayed into the second portion of air, and also wets the outside porous surface of the long and short tubes 28 in the blind chamber. This causes the compressed product air to be cooled continually over the tube's length by water evaporating into the second air portion. The psychometric analysis shows that the temperature of the compressed product air inside the tubes 28 is reduced sensibly and incrementally over the tube length towards its dew point temperature.

This is accomplished by the second air portion in the blind counterflow chamber of the lower heat exchanger 24 having been sensibly cooled to a lower wet bulb temperature, which ideally is equal to the incoming air's dew point temperature. As the second air portion continues to travel inside the blind chamber and across the wetted outside porous surfaces of the tubes 28 in counterflow it is heated by the compressed product air which is passing inside the tubes 28, raising the wet bulb temperature of the second air portion and ensuring that this portion of air is at saturation.

The top heat exchanger 26 receives the two split portions of the primary airstream from the lower heat exchanger, one near each end. The first portion of the dry cooled air that leaves the tubes 28 from the lower heat exchanger 24 moves via the aft duct to the top heat exchanger 26 and then is directed in counterflow to the hot stack gas 20 which is passing inside the tubes 32 of the top heat exchanger. This first portion of the dry cooled compressed air has water added causing this portion to be humidified as in the lower heat exchanger 24 and cooling the stack gas 20 inside the tubes 32 of the top heat exchanger 26 to the wet bulb temperature of the first air portion which is passing along the wetted outside porous surface of the tubes 32.

The wet bulb temperature of the first air portion increases as the air moves across the tubes 32 absorbing the heat from the stack gas 20 inside the tubes and raising absolute humidity of the air. At some predetermined point the second air portion enters via the forward duct to the top heat exchanger to rejoin the first air portion. Together these first and second portions of air then move in counterflow to the hot stack gas 20 from the turbine. Finally hot saturated compressed product air 18 is directed via the outlet 48 to the combustion chamber.

It may be desirable to add heat to, or superheat the compressed product air, and at that point water will not be sprayed in part of the outside porous surface of the tubes 32 of the top heat exchanger preventing any further humidification, adding only heat. At the same time the compressed product air is cooled inside the tubes 28 of the lower heat exchanger, the excess water near the aft ends of the open short tubes is also cooled to the wet bulb temperature of the air around it. Therefore the water near the aft ends of the short tubes is the coolest.

For this reason it may be desirable to have several water inlets and outlets so that the coldest water can be used to cool for instance the intercooler of a multistage compressor of a gas turbine. Additional water inlets may be desirable to help regulate the amount of superheating in the top heat exchanger.

Compressed gas fuel or natural gas very often has a lower water vapor pressure and therefore temperature than the compressed product air 18 at the same temperature. This means that gas fuel also has the ability to absorb water vapor at a lower temperature. When using compressed gas fuel instead of the compressed product air as the primary gas stream 18 in the humidifier 22, water 38 can be evaporated into the gas fuel with waste heat from the stack gas exhaust 20 used to force a high evaporation rate.

If the dew point temperature of the compressed fuel gas is reduced below 200° F., then the water vapor in the stack gas may begin to condense out depending on the humidity in the stack gas. This gives added waste heat recovery in both sensible and latent heat forms of the exhaust stack gas.

The dual shell and tube heat and mass exchanger or saturator 22 has many advantages compared with known apparatuses. These include:

1. there is no need for after compression heat exchangers to cool the compressed air with the cool water from the saturator, before entering the saturator;

2. there is no need for a recuperator as the function thereof is included in the top exchanger;

3. there is no need for a humidification tower that cannot fully saturate the air and is dependent on the heat exchangers;

4. there is no need for a boiler to better humidify the compressed air;

5. only the available heat limits humidification of the compressed air;

6. control of the humidification of the compressed air and superheating this air with the exhaust gas is simply effected by the amount and location of water entering the shell side of the top exchanger; the properties of high-pressure air and water vapor mixtures are not well known creating problems in sizing and design of existing equipment; this is not the case with the humidifier 22 as it is self-regulating by its design and can easily be adjusted to whatever conditions are desired;

7. cooling water can be drawn from the cold-water outlet of the lower heat exchanger if desired;

8. there is less pressure drop, as there are fewer pieces of equipment to travel through;

9. less surface area is needed, as the heat transfer rate is higher due to the evaporation on the outside of the tubes;

10. the temperature difference is greater as the tube wall temperature will become the wet bulb temperature of the surrounding air;

11. the initial cost and on-going operating costs are less;

12. the concept has been well proven in several types of apparatus;

13. well defined and proven heat and mass transfer calculations for shell and tube heat exchangers can be used for sizing; and 14. plate heat exchangers can also be used with this same concept.

Figure 6:
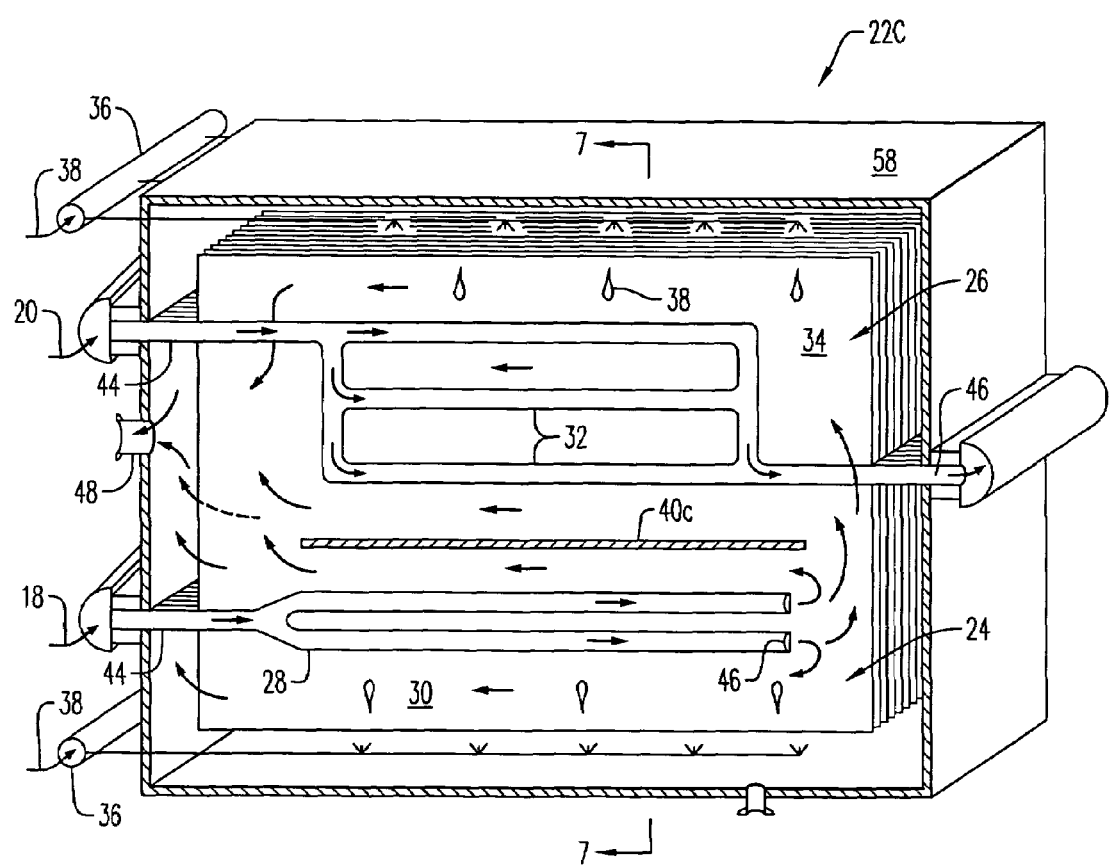
FIG. 6 is a partly sectional, schematic view of a tube-in-plate configuration of the saturator illustrated in FIG. 1 in accordance with another embodiment.
Figure 7:
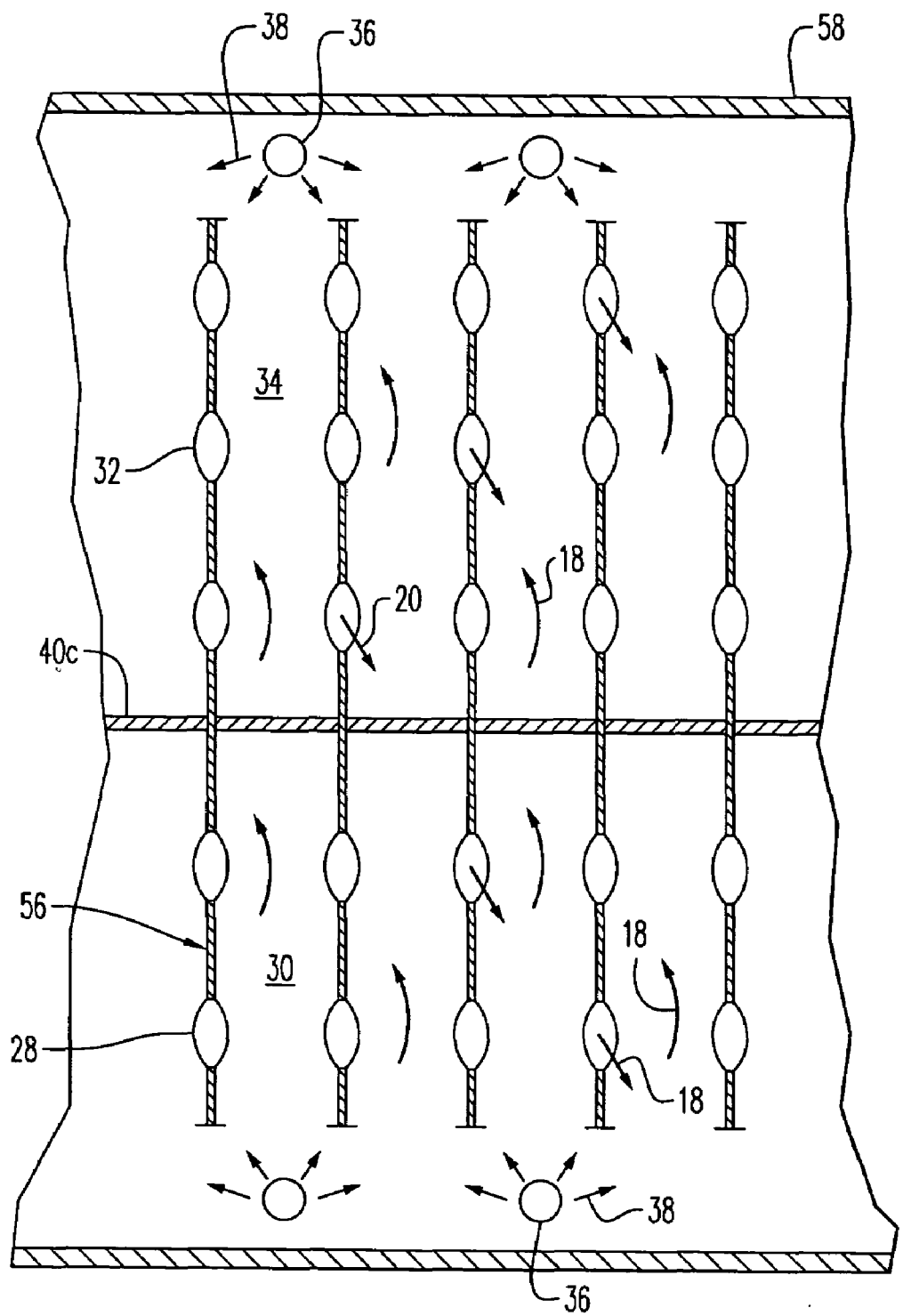
FIG. 7 is an elevational sectional view of a portion of the saturator illustrated in FIG. 6 and taken along line 7—7.

Examples of the plate duplex exchangers are illustrated schematically in FIGS. 6–10. A first embodiment of a split counterflow plate saturator, designated 22C, is illustrated in FIGS. 6 and 7. The first and second heat exchangers 24,26 described above are incorporated in a common stack of thin plates 56 suitably mounted in a box housing or frame 58.

Each of the plates includes a bank of first tubes 28 integral therewith which collectively define the first main flow channel of the first heat exchanger; and the first counterflow channel 30 is defined between corresponding portions of the plate outside the first tubes 28.

Similarly, each of the plates also includes a bank of second tubes 32 integral therewith which collectively define the second main channel of the second heat exchanger; and the second counterflow channel 34 is defined between corresponding portions of the plates outside the second tubes.

As shown in FIG. 7, the first and second tubes 28,32 are integrally formed in the plates in any conventional manner and project into the corresponding counterflow channels 30,34 defined laterally between the stacked plates.

As shown in FIG. 6, the first tubes 28 in each plate have a common inlet 44 at the forward end of the plate, and discrete outlets 46 at opposite ends of the plates, preferably terminating short thereof, for providing flow communication to both counterflow channels 30,34 in common. The second tubes 32 in each of the plates also have a common inlet 44 at the forward end thereof, and a common outlet 46 at the aft end of the plates.

In this way, the secondary fluid stream 20 is fully contained within the second main channels 32 as it flows through the upper portion of the enclosure. The primary gas stream 18 is channeled through the first main channels 28 and discharged at the aft ends thereof into the space between the stacked plates defining both counterflow channels 30,32. The cool, dry primary stream discharged from the stack of first main channels 28 then flows in counterflow between the plates back to the forward end of the plates for discharge through the common outlet 48 in the housing.

The stack of plates 56 illustrated in FIGS. 6 and 7 may also include an optional septum or seal 40c separating the banks of first and second tubes 28,32 from each other. The septum also separates the first and second counterflow channels 30,34 at least in part from each other between the stacked plates.

As shown in FIG. 6, the septum splits the cool dry primary stream 18 discharged from the first tubes 28 at the aft end of the septum for flow through both counterflow channels 30,34. The two counterflow channels rejoin at the forward end of the septum 40c for discharging the rejoined, saturated primary stream through the common outlet 48.

The means 36 for injecting the evaporative fluid 38 into the two counterflow channels 30,34 may be suitably configured for the plate configuration for injecting the fluid between adjacent plates and outside the corresponding integral tubes 28,32 thereof.

In the various embodiments disclosed herein, the velocity of the primary gas stream being channeled through the two heat exchangers will be as large as practical which permits injection of the evaporative fluid at any convenient location, with the fluid being rapidly disbursed in the fast moving primary stream.

Figure 8:
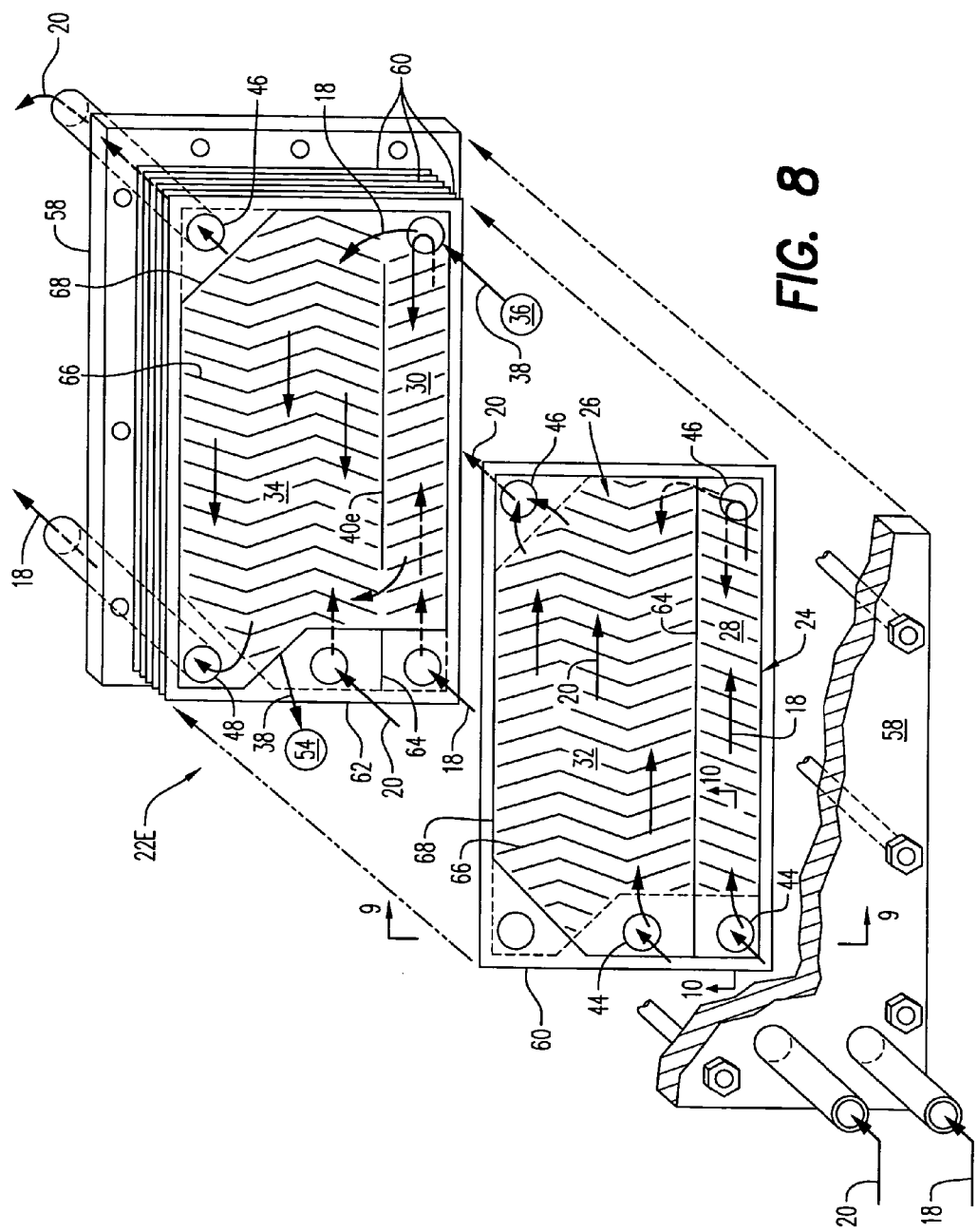
FIG. 8 is a partly exploded and sectional view of a corrugated plate duplex exchanger saturator corresponding with FIG. 1 in accordance with another embodiment.
Figure 9:
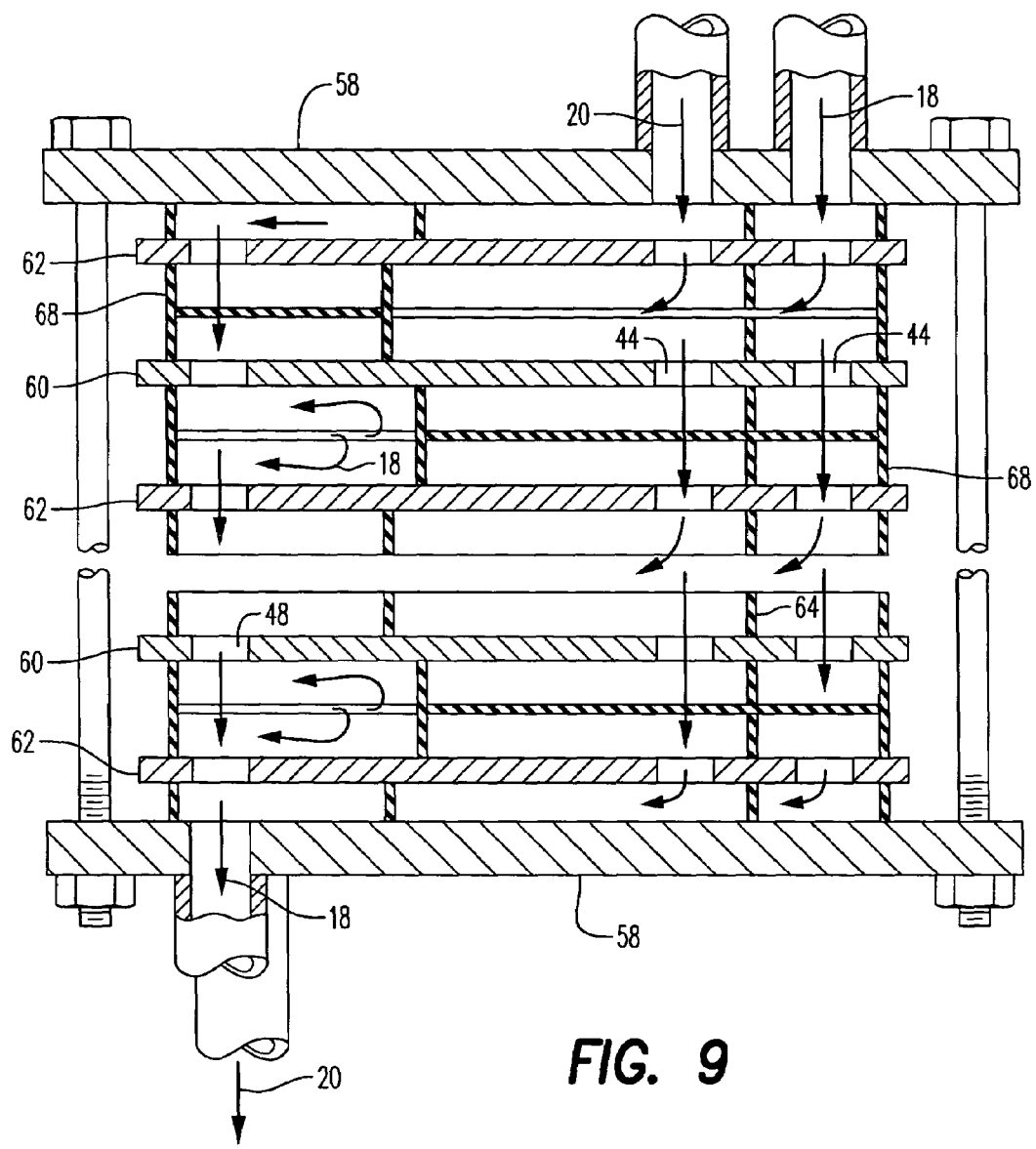
FIG. 9 is a transverse sectional view through a portion of the plate saturator illustrated in FIG. 8 and taken along line 9—9.
Figure 10:
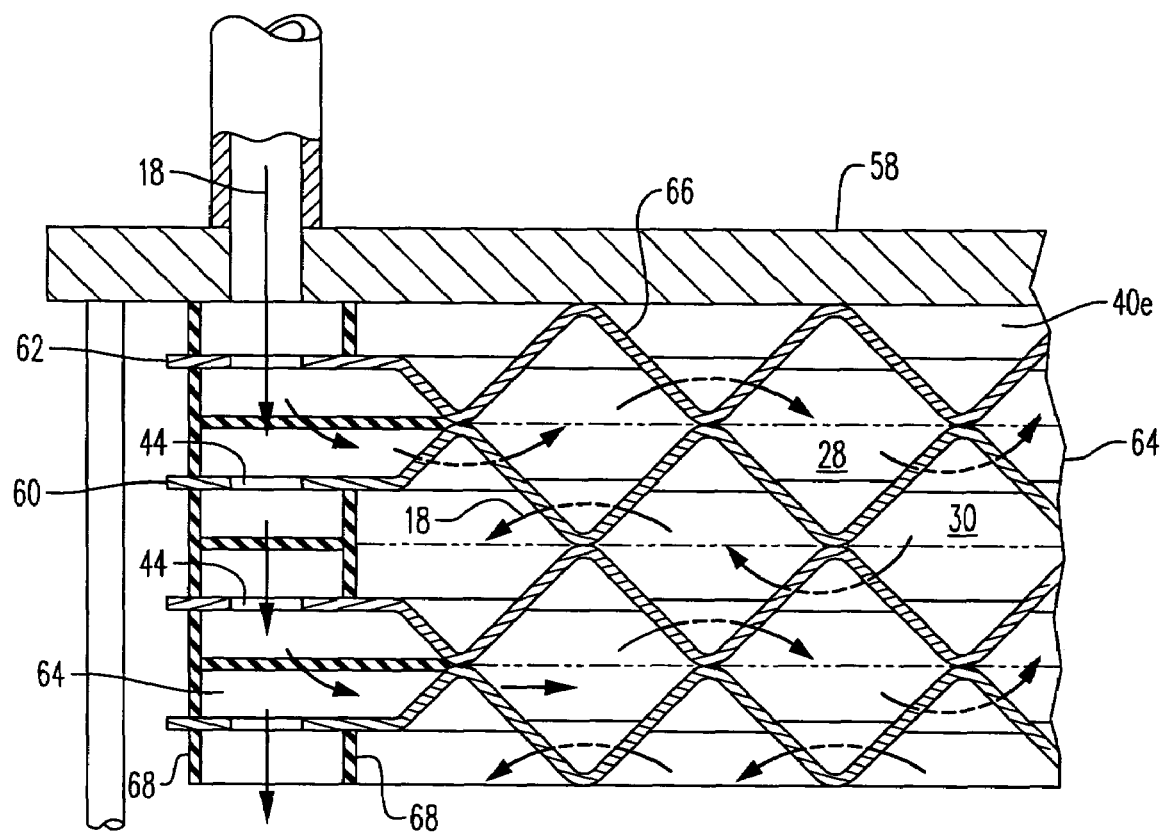
FIG. 10 is another transverse sectional view through a portion of the plate saturator illustrated in FIG. 8 and taken along line 10—10.

FIGS. 8–10 illustrate yet another embodiment of the duplex exchanger configured as a split counterflow saturator, designated 22E. In this embodiment, the two heat exchangers 24,26 include a stack of alternating first and second plates 60,62 suitably mounted in a frame 58 defined by opposite endplates joined by tie bolts. Each of the plates includes a partition or seal 64 on corresponding sides thereof which collectively define the first and second main flow channels 28,32 between alternating pairs of the plates.

Correspondingly, the first and second counterflow channels 30,34 are defined on opposite sides of each of the stacked plates between different alternating pairs thereof. In this way, the two dry-side main channels 28,32 are disposed between two plates, and the two wet-side counterflow channels 30,34 are disposed between the next two plates, and the sequence alternates from plate to plate in the stack.

As shown in FIG. 8, each of the first plates 60 further includes an inlet aperture 44 at the forward end thereof for channeling the primary gas stream 18 into the first main channel 28. The first plates also include an outlet or transfer aperture 46 at the opposite aft end thereof for discharging the primary stream from the first main channel 28. Since the outlet aperture 46 extends through the plate it provides direct flow communication to the first and second counterflow channels 32,34 disposed on the back side of the corresponding main channels 28,32.

The first plates also include yet another inlet 44 at the forward ends thereof for introducing the secondary fluid stream 20 into the second main channel 32. And, another outlet aperture 46 is disposed in the aft end of the first plates for discharging the secondary stream from the second main channel.

Correspondingly, each of the second plates 62 illustrated in FIG. 8 includes a respective outlet aperture 48 at the forward end thereof for providing a common outlet for the two counterflow channels 30,34.

As shown in FIGS. 8 and 10, the two plates 60,62 further include complementary herringbone corrugations 66 which adjoin each other, and surrounding perimeter seals 68 to further define the first and second main flow channels 28,32 between corresponding sides of the plates, and also defining the cooperating first and second counterflow channels 30,34 on the opposite sides of the plates, with the main channels and counterflow channels alternating between the stacked plates.

Corrugated plate heat exchangers are conventional and may be suitably modified and configured for introducing the cooperating two heat exchangers in the manner illustrated schematically in FIG. 1. The corrugations 66 are locally formed in the otherwise thin, flat plates 60,62 to define the different heat exchangers 24,26 bounded within flat lands. The partition and perimeter seals 64,68 are located at the flat lands to seal the boundaries of the heat exchangers.

As shown in FIGS. 8–10, the primary airstream 18 is suitably channeled in parallel through the first main channel 28 between alternating plates and is discharged through the aft outlet apertures 46 thereof into the spaces between the next plates. Those spaces include the two counterflow channels 30,34 through which the primary stream is channeled back toward the forward end of the plates.

Correspondingly, the hot secondary stream is channeled in parallel through the second main channel 32 between the stacked plates and is discharged through the aft outlet aperture 46.

The coolant and saturant injecting means 36 are suitably introduced in the stacked plate configuration for injecting a common evaporative fluid 38 into the first and second counterflow channels 30,34 downstream of the aft outlets 46 in the first plates 60 where the outlets join the first main channel 28 with both the first and second counterflow channels 30,34. In this way, the evaporative fluid is injected into both counterflow channels for providing evaporative cooling of the primary and secondary streams in the two main channels 28,32.

If desired, a suitably short septum seal 40e as illustrated in FIG. 8 may be disposed at least in part between the stacked first and second plates 60,62 opposite to the partition seal 64 to separate the corresponding first and second counterflow channels 30,34. In this way, the primary gas stream is split at the common entrance ends of the two counterflow channels for separate counterflow therealong and then rejoins at the forward ends of the plates prior to discharge from the common outlet aperture 48 in the several plates.

The herringbone corrugations 66 illustrated in FIGS. 8–10 are the same on both sides of each plate, but have different and complementary configurations for the two plate types 60,62. In this way, they can be stacked together and sealed to define the different flowpaths therein; with the flow streams following serpentine paths between the overlapping corrugations where they abut or adjoin.

The corresponding inlets and outlets for the plates are defined by the respective apertures therein and the interplate seals therebetween, and the interruptions therein in a conventional manner. The first plates 60 have four active apertures for flow control, and the second plates 62 have two active apertures for flow control; with only the aft outlet 46 of the first main channel 28 being common to the stacked plates to internally feed the primary stream 18 to the two counterflow channels 30,34 formed between alternating plates.

Accordingly, the two plates 60,62 collectively have five active apertures between them, which are identically located in the entire stack of plates in corresponding alignment for providing continuous inlet, outlet, and transfer flowpaths or manifolds therethrough.

In this way, two inlet conduits may be provided in one endplate 58 as shown in FIGS. 8–10 for isolated feeding of the primary and secondary inlet streams 18,20 to only the first and second main channels 28,32 of each plate. Suitable interplate seals confine the inlet flows, and prevent inlet flow of these streams to the first and second counterflow channels 30,34.

The aft outlet apertures 46 of the first main channels 28 also define common inlets to the first and second counterflow channels 30,34, and those transfer apertures are aligned through the stack of plates and bound by the perimeter seals 68 to contain the flow internal to the plate stack.

And, two outlet conduits may be provided in the opposite endplate 58 for isolated discharge of the primary and secondary outlet streams from the corresponding second counterflow channels 34 and second main channels 32 as confined by suitable interplate seals.

As indicated above, FIG. 1 illustrates a simple schematic representation of the split counterflow saturator form of the evaporative duplex counterheat exchanger and the cooperating two heat exchangers therein. The primary gas stream is sensibly cooled in the main flow channel by evaporation of the fluid in the cooperating counterflow channel. The cool and dry primary stream is then split for counterflow back through the first heat exchanger as well as through the second heat exchanger. The hot secondary stream is channeled through the main channel of the second heat exchanger for evaporating the fluid in the corresponding counterflow channel to humidity or saturate the previously cooled and dry primary stream. The primary stream is then discharged from the saturator for any suitable purpose, such as adding mass to the combustion process in the exemplary turbine system illustrated.

FIGS. 2–10 illustrate various forms of evaporative duplex counterheat exchangers specifically cooperating in the manner illustrated in FIG. 1. Any type of conventional heat exchanger including tube-in-shell and plate designs may be configured and modified for use in the manner illustrated in FIG. 1. FIGS. 2–10 are merely exemplary of the various forms of otherwise conventional heat exchangers which may be used for achieving the improved split counterflow configuration disclosed above.

The split counterflow saturator may be configured for any other applications in which it is desired to saturate one fluid in another. And, the evaporative duplex counterheat exchanger may be configured and used in other applications for advantageous use of the saturated primary stream, or the cooled secondary stream, or the cooled condensate liquid of the evaporative fluid.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

What is claimed is:

1. A duplex exchanger comprising:
 a first heat exchanger including a first main flow channel and a first counterheat channel joined in flow communication with said first main channel;
 a second heat exchanger including a second main flow channel and a second counterheat channel joined in flow communication with said first heat exchanger; and
 means for injecting an evaporative coolant into said first counterheat channel.

2. A duplex exchanger according to claim 1 wherein said second counterheat channel is joined in flow communication with said first main channel.

3. A duplex exchanger according to claim 2 further comprising means for injecting an evaporative saturant into said second counterheat channel.

4. A duplex exchanger according to claim 3 wherein said second counterheat channel is additionally joined in flow communication with said first counterheat channel.

5. A duplex exchanger according to claim 4 wherein:
 said first heat exchanger includes a bank of first tubes collectively defining said first main channel supported in a plurality of alternating first baffles collectively defining said first counterheat channel around said first tubes; and
 said second heat exchanger includes a bank of second tubes collectively defining said second main channel supported in a plurality of second baffles collectively defining said second counterheat channel around said second tubes.

6. A duplex exchanger according to claim 5 further comprising a septum separating said first and second heat exchangers for controlling flow therebetween.

7. A duplex exchanger according to claim 6 wherein said first heat exchanger is disposed in a first tubular shell and said second heat exchanger is disposed in a second tubular shell, and said shells provide a double septum therebetween.

8. A duplex exchanger according to claim 6 wherein both said first and second heat exchangers are disposed in a common tubular shell, and said septum divides said shell into two corresponding compartments for said heat exchangers.

9. A duplex exchanger according to claim 6 wherein said first and second tubes include external fins for increasing wetting surface area thereof for said evaporative coolant and saturant.

10. A duplex exchanger according to claim 6 wherein:
said first heat exchanger includes a first inlet at a forward end for providing said primary stream to said first tubes, a first outlet at an opposite aft end for discharging a first portion of said primary stream from said first tubes, and a second outlet disposed between said first inlet and outlet for discharging a second portion of said primary stream from said first counterheat channel; and
said second heat exchanger includes a first inlet at a forward end for providing said secondary stream to said second tubes, a first outlet at an opposite aft end for discharging said secondary stream from said second tubes, a second outlet adjacent said first inlet thereof for discharging said primary stream from said second counterheat channel, and a second inlet adjacent said first outlet thereof for receiving said first portion of said primary stream from said first outlet of said first heat exchanger.

11. A duplex exchanger according to claim 10 wherein said second heat exchanger further includes a third inlet adjacent said first inlet thereof for receiving said second portion of said primary stream from said second outlet of said first heat exchanger.

12. A duplex exchanger according to claim 4 wherein:
said first and second heat exchangers include a common stack of plates;
each of said plates including a bank of first tubes integral therewith and collectively defining said first main channel, and said first counterheat channel being defined between said plates outside said first tubes; and
each of said plates further includes a bank of second tubes integral therewith correspondingly defining said second main channel, and said second counterheat channel being defined between said plates outside said second tubes.

13. A duplex exchanger according to claim 12 wherein:
said first tubes have common inlets at a forward end of said plates, and discrete outlets at opposite ends of said plates providing flow communication to said first and second counterheat channels between said plates; and
said second tubes have common inlets at said plate forward ends, and common outlets at said plate aft ends.

14. A duplex exchanger according to claim 13 further comprising a septum separating said banks of first and second tubes from each other, and also separating said first and second counterheat channels between said plates.

15. A duplex exchanger according to claim 14 wherein said coolant and saturant injecting means are configured to inject said coolant and saturant between said plates outside said first and second tubes therein.

16. A duplex exchanger according to claim 4 wherein:
said first and second heat exchangers include a stack of alternating first and second plates;
each of said plates including a partition collectively defining said first and second main channels between alternating pairs of said plates, and said first and second counterheat channels being defined between different alternating pairs of said plates;
each of said first plates further includes an inlet at a forward end for said first main channel, and an outlet at an opposite aft end for said first main channel disposed in flow communication with both said first and second counterheat channels, another inlet at said forward end for said second main channel, and another outlet at said aft end for said second main channel; and
each of said second plates further includes an outlet at a forward end for said first and second counterheat channel.

17. A duplex exchanger according to claim 16 wherein said first and second plates further include complementary corrugations adjoining each other inside surrounding perimeter seals to further define said first and second main channels and said first and second counterheat channels between said alternating plates.

18. A duplex exchanger according to claim 16 wherein said coolant and saturant injecting means commonly inject a cooling and saturating fluid into said first and second counterheat channels downstream of said outlets in said first plates joining said first main channel with said first and second counterheat channels.

19. A duplex exchanger according to claim 18 further comprising a septum seal disposed at least in part between said first and second plates to separate said first and second counterheat channels.

20. A method of using a duplex exchanger comprising:
a first heat exchanger including a first main flow channel and a first counterheat channel joined in flow communication with said first main channel;
a second heat exchanger including a second main flow channel, and a second counterheat channel joined in flow communication with said first main channel and with said first counterheat channel;
means for injecting an evaporative coolant into said first counterheat channel; and
means for injecting an evaporative saturant into said second counterheat channel; and said method comprises:
channeling a hot primary gas stream through said first main channel;
splitting said primary stream into both said first and second counterheat channels,
injecting said evaporative coolant into said first counterheat channel for being evaporated by said hot primary stream flowing through said first main channel, and thereby cooling said primary stream therein;
channeling a hot secondary fluid stream through said second main channel for heating said cooled primary stream in said second counterheat channel; and
injecting said evaporative saturant into said second counterheat channel for being evaporated by said hot secondary stream flowing through said second main channel, and thereby saturating said primary stream discharged through said second counterheat channel.

21. A method according to claim 20 further comprising discharging said primary stream from said first counterheat channel into an intermediate stage of said second counterheat channel.

22. A method according to claim 21 further comprising:
injecting said evaporative saturant along an initial stage of said second counterheat channel; and superheating said primary stream in said second counterheat channel downstream of said initial stage using heat from said secondary stream channeled through said second main channel.

23. A method according to claim 21 further comprising:
   injecting said evaporative coolant along an initial stage of said first counterheat channel; and
   superheating said primary stream in said first counterheat channel downstream of said initial stage using heat from said primary stream channeled through said first main channel.

24. A method according to claim 21 further comprising injecting excess evaporative coolant into said first counterheat channel for cooling thereof, and removing said cooled excess evaporative coolant from said first heat exchanger.

25. A method for saturating a hot primary gas stream comprising:
   channeling said primary stream through a first main channel;
   channeling a hot secondary fluid stream through a second main channel;
   splitting said primary stream discharged from said first main channel to flow in a first counterheat channel adjoining said first main channel and in a second counterheat channel adjoining said second main channel;
   injecting an evaporative fluid into said first counterheat channel to evaporatively cool said primary stream flowing through said first main channel; and
   injecting an evaporative fluid into said second counterheat channel to saturate said primary stream flowing therethrough.

26. A method according to claim 25 further comprising discharging said primary stream from said first counterheat channel into an intermediate stage of said second counterheat channel.

27. A method according to claim 26 further comprising:
   evaporatively cooling said primary stream in said first main channel for lowering the wet bulb temperature thereof toward the dew point temperature of the incoming primary stream; and
   saturating said primary stream in said first counterheat channel to the wet bulb temperature of said cooled primary stream discharged from said first main channel.

28. A method according to claim 27 further comprising heating said cooled primary stream in said first counterheat channel by said hot primary stream in said first main channel for raising the dew point temperature thereof and saturating said primary stream therein.

29. A method according to claim 28 further comprising evaporating said evaporative fluid in said primary stream in said second counterheat channel and thereby cooling said secondary stream in second main channel toward the wet bulb temperature of said primary stream in said second counterheat channel.

30. A method according to claim 29 further comprising heating said cooled primary stream in said second counterheat channel by said hot secondary stream in said second main channel for increasing the wet bulb temperature and saturation thereof.

31. A method according to claim 30 further comprising:
   injecting said evaporative fluid along an initial stage of said second counterheat channel; and
   superheating said primary stream in said second counterheat channel downstream of said initial stage using heat from said secondary stream channeled through said second main channel.

32. A method according to claim 30 further comprising:
   injecting said evaporative fluid along an initial stage of said first counterheat channel; and
   superheating said primary stream in said first counterheat channel downstream of said initial stage using heat from said main stream channeled through said first main channel.

33. A method according to claim 30 further comprising injecting excess evaporative fluid into said first counterheat channel for cooling thereof, and removing said cooled excess evaporative fluid from said first heat exchanger.

* * * * *